(No Model.) 5 Sheets—Sheet 1.

W. BECHTOLD.
MACHINE FOR MANUFACTURING ARTICLES OF GLASS.

No. 493,808. Patented Mar. 21, 1893.

WITNESSES:
A. Faber du Faur
F. Fohr.

INVENTOR:
William Bechtold,
BY A. Faber du Faur
ATTORNEY.

(No Model.) 5 Sheets—Sheet 2.

W. BECHTOLD.
MACHINE FOR MANUFACTURING ARTICLES OF GLASS.

No. 493,808. Patented Mar. 21, 1893.

WITNESSES:
A. Faber du Faur
F. Fohr.

INVENTOR:
William Bechtold,
BY A. Faber du Faur
ATTORNEY.

(No Model.) 5 Sheets—Sheet 3.

W. BECHTOLD.
MACHINE FOR MANUFACTURING ARTICLES OF GLASS.

No. 493,808. Patented Mar. 21, 1893.

WITNESSES:

INVENTOR:
William Bechtold,
BY
ATTORNEY.

(No Model.) 5 Sheets—Sheet 4.
W. BECHTOLD.
MACHINE FOR MANUFACTURING ARTICLES OF GLASS.
No. 493,808. Patented Mar. 21, 1893.
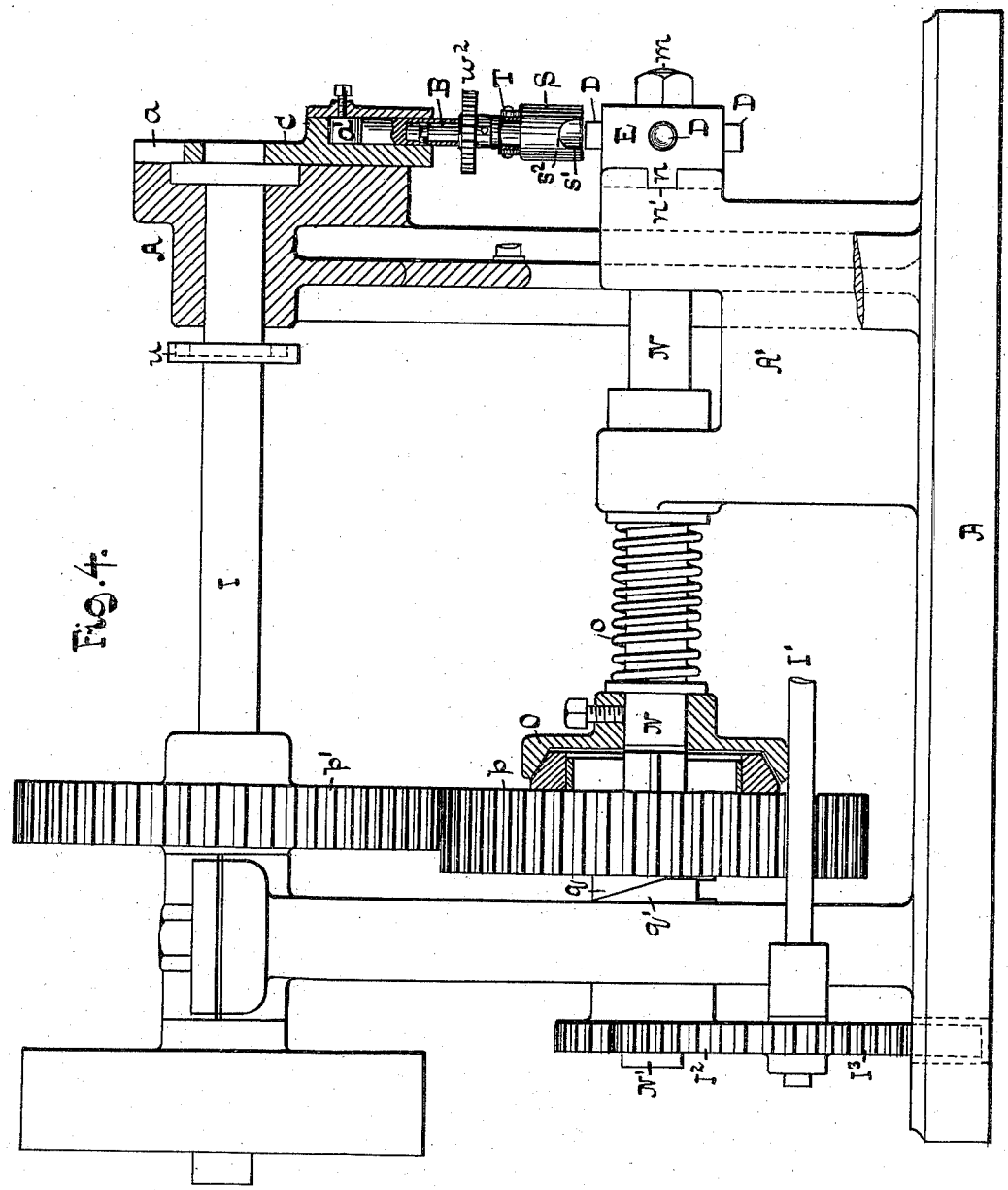
WITNESSES:
A. Faber du Faur
F. Fohr.
INVENTOR:
William Bechtold,
BY A. Faber du Faur
ATTORNEY (No Model.) 5 Sheets—Sheet 5.
W. BECHTOLD.
MACHINE FOR MANUFACTURING ARTICLES OF GLASS.
No. 493,808. Patented Mar. 21, 1893.
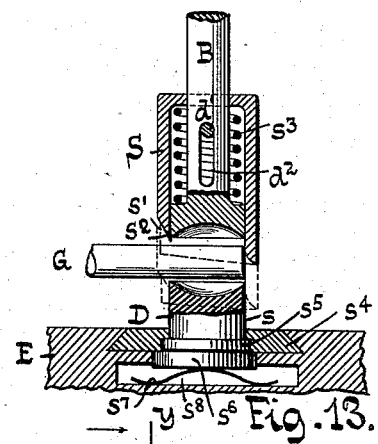
Fig. 9.
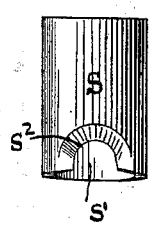
Fig. 11.
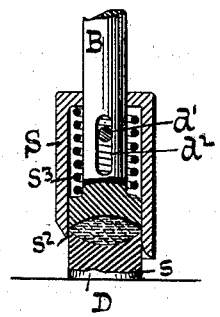
Fig. 10.
Fig. 13.
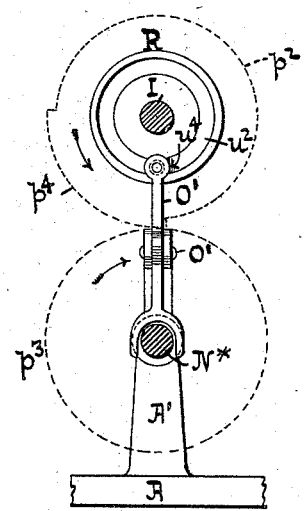
Fig. 12.
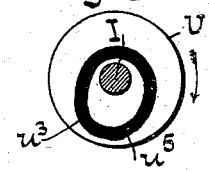
Fig. 14.
WITNESSES:
A. Faber du Faur
F. Fohr
INVENTOR:
William Bechtold.
BY A. Faber du Faur jr.
ATTORNEY.

UNITED STATES PATENT OFFICE.

WILLIAM BECHTOLD, OF NEW YORK, N. Y.

MACHINE FOR MANUFACTURING ARTICLES OF GLASS.

SPECIFICATION forming part of Letters Patent No. 493,808, dated March 21, 1893.

Application filed October 28, 1891. Serial No. 410,048. (No model.)

*To all whom it may concern:*

Be it known that I, WILLIAM BECHTOLD, a citizen of the United States, and a resident of New York, in the county and State of New York, have invented certain new and useful Improvements in Machines for Manufacturing Articles of Glass, of which the following is a specification.

Figure 1:
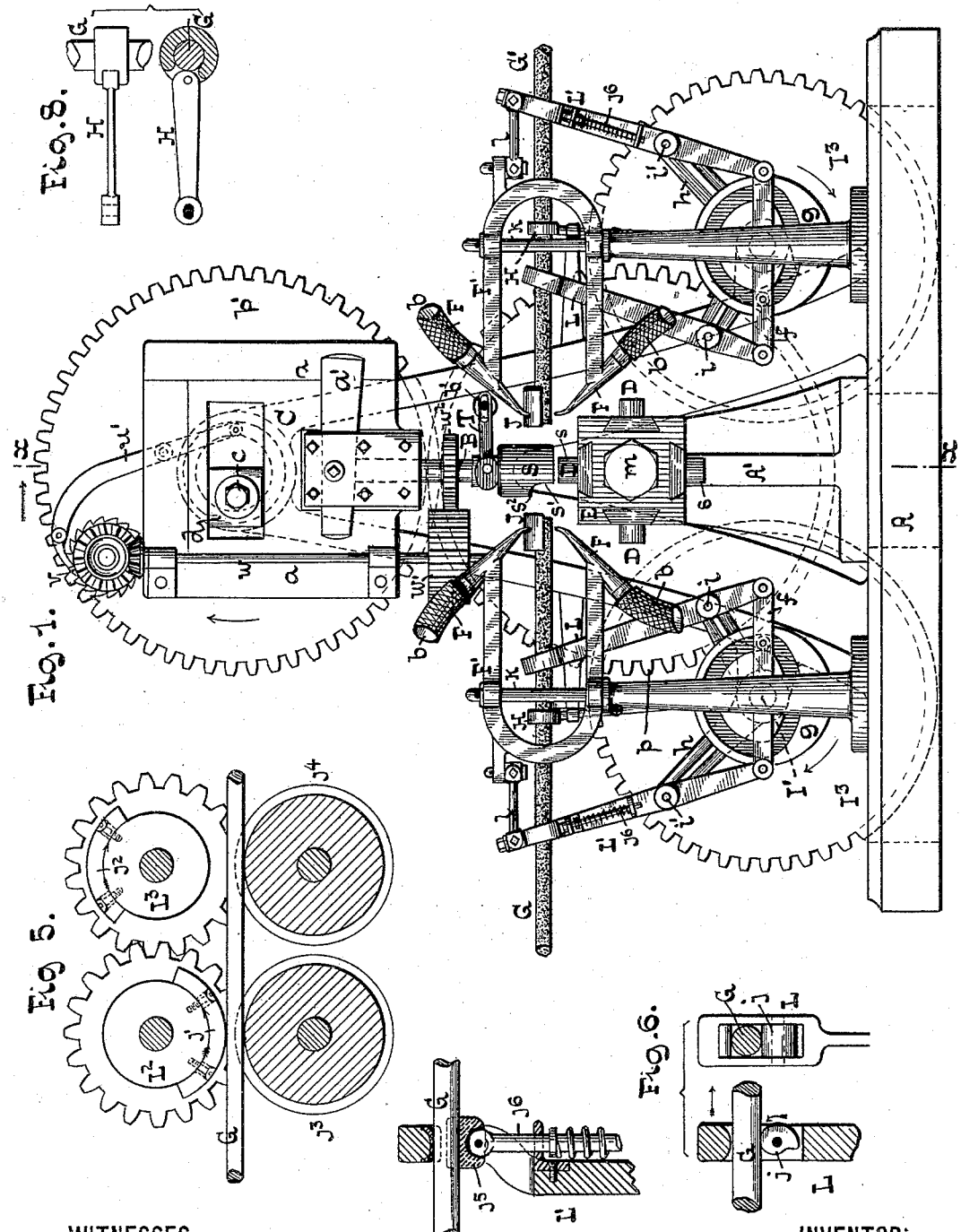
Figure 2:
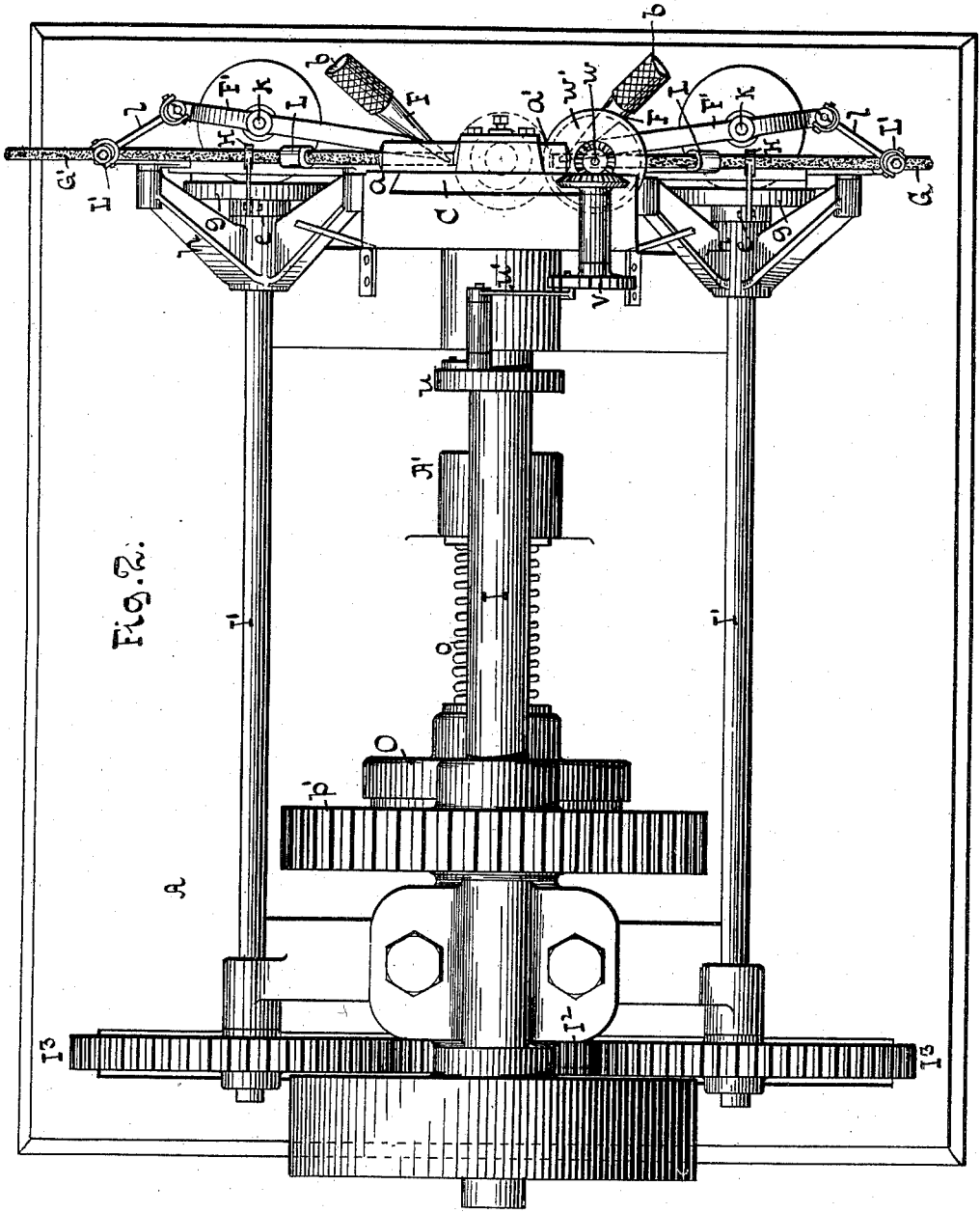
Figure 3:
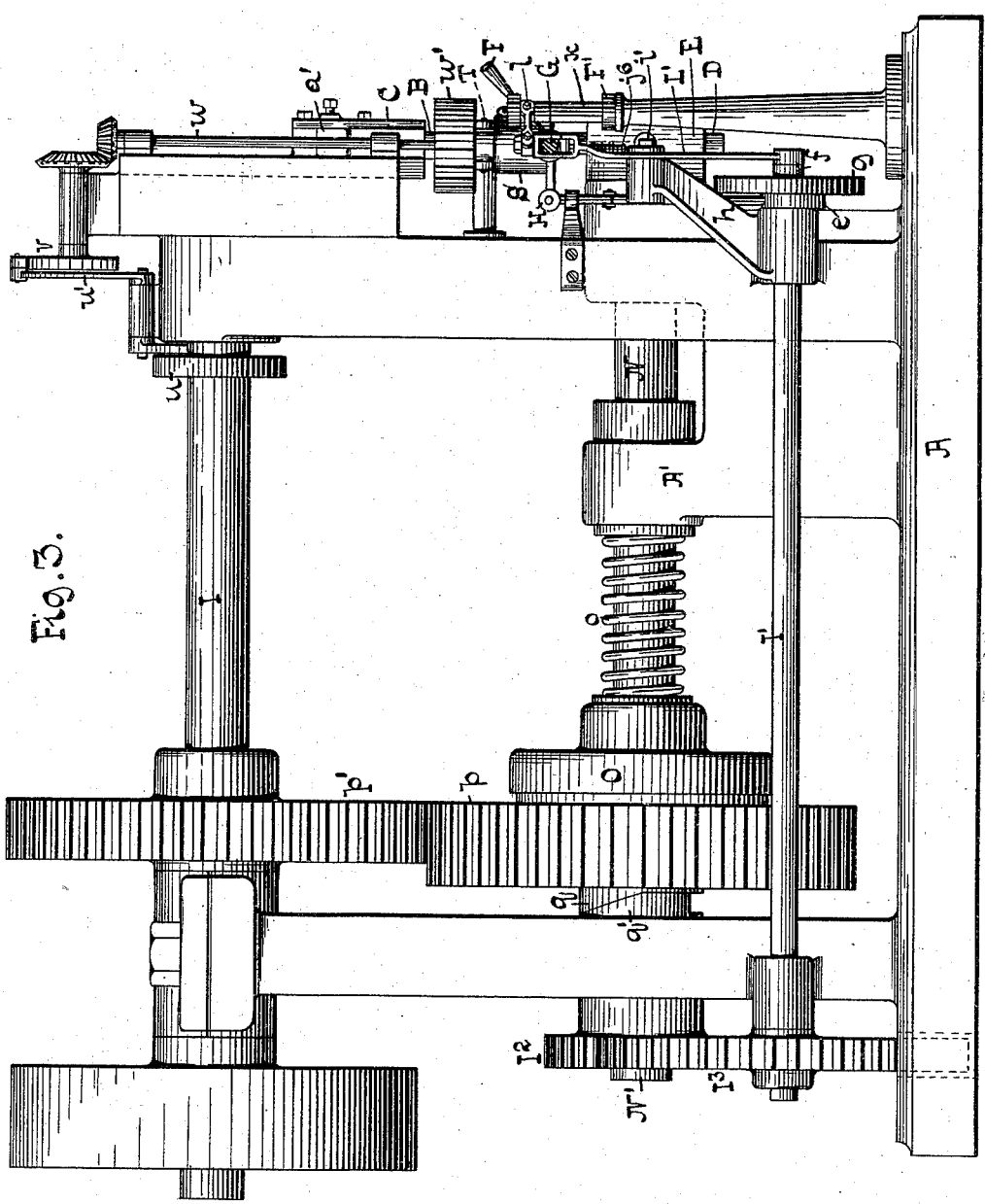

My invention has for its object to provide a machine for the continuous and automatic production of beads, nail heads, bulls' eyes or other articles of glass or similar material. Heretofore small articles of glass have been made from the rod by alternately heating the end of the same and subjecting the heated portion to the action of suitable dies and punches, the several operations being performed by hand. In order to facilitate the manufacture of such articles of glass and thereby reduce the cost thereof, I have devised a machine embodying in its structure a punch and die, or the equivalent thereof, devices for heating and feeding the rod to the former, and a severing device for cutting the required lengths from the rod,—the several devices co-operating to automatically and continuously produce the articles mentioned, all of which together with other novel features of my invention are more fully pointed out in the following specification and claims and illustrated in the accompanying drawings, in which, Figure 1 represents a front elevation of a machine constructed according to my invention. Fig. 2 is a plan or top view thereof. Fig. 3 is a side elevation. Fig. 4 is a longitudinal section in the plane $x\ x$ Fig. 1. Fig. 5 is a sectional elevation of a modified form of a device for feeding forward and withdrawing the glass rod. Figs. 6 and 7 are sectional detail views, on a larger scale than the preceding figures, of the devices for feeding the glass rod incorporated in the machine illustrated. Fig. 8 is a detail view of the device for turning the glass rod. Figs. 9 and 10 are sectional elevations illustrating the operation of the punch, die and severing sleeve. Fig. 11 is an elevation of the severing sleeve. Fig. 12 is a section in the plane $y\ y$, Fig. 13. Fig. 13 is a sectional elevation illustrating modifications of part of the devices. Fig. 14 is an elevation of a detail part.

Similar letters indicate corresponding parts throughout the several views.

In the drawings the letter A designates a frame suitably constructed to support the several operating parts of the machine. The punch B is held securely in a carriage C guided in vertical ways $a$ in the frame, said punch being adjustable with respect to the die head E by means of a key $a'$ or other well known means. The carriage is reciprocated by any suitable connection with a driving shaft I mounted to turn in bearings in the frame,—motion in this instance being communicated to the carriage by an eccentric pin $c$ on the driving shaft which engages a block $d$ playing in a transverse slot in the carriage. The dies D, which in this example number four are mounted in the respective sides of the die head E and preferably so as to be interchangeable.

In the example illustrated, the machine is arranged to feed a glass rod alternately from opposite sides to the die, however for the present I shall confine the description to a machine for feeding but one rod which would be represented by one side of Fig. 1, say the left hand side.

The glass rod G, supported in any suitable manner, either upon rolls or in a tube (not shown), is normally held with its inner end at a short distance from the die head and while in this position its end portion is subjected to the flames from suitable burners F F to which gas is supplied by the flexible tubes $b\ b$. To confine the heat a hood as J, partially surrounding the rods may be placed at the inner end of the same, said hood being slotted to admit the upper burner F.

In order to obtain a uniform heating and to prevent drooping of the viscous mass it is best that the glass rod should be turned about its longitudinal axis while subjected to the flames,—and to this end I make use of a grip lever H, Figs. 2, 3 and 8 of well known construction which has a portion encompassing the rod and has an oscillating movement imparted thereto by an eccentric $e$, mounted on a shaft I' which latter is driven from a shaft N' by gears $I^2, I^3$. To feed the rod from the burners to the punch and die and to return the same to the burners at determinate intervals, I make use of two levers L and L' having their upper ends constructed to engage the rod while their lower ends are united by a link $f$ (see Fig. 1), having thereon a roller stud engaging a groove in a cam $g$ mounted on the shaft I'. The levers are pivoted respectively at $i$ and $i'$ to a bracket $h$, the pivots being so placed that the sweep of lever L exceeds that of lever L' by a length equal to the portion to be severed from the end of the rod at the punch and die, so that when the rod is withdrawn its end will again be between the burners. If desired the parts may be so constructed that the feed can be adjusted to correspond to a larger or smaller article to be produced.

The lever L is provided with a gravitating cam $j$ (see Fig. 6) arranged to bite upon the glass rod when said lever is moved toward the die head but to release the same on the return stroke. The lever L' is provided with any suitable form of friction grip, for instance as shown in Fig. 6, a jaw $j^5$ is arranged to engage with the rod, said jaw having a pivotal connection with a spring bar $j^6$ secured to the lever. The spring is of such strength that the bar will be gripped on the return stroke and carried with the lever, while on the forward stroke the hold of cam $j$ on lever L is strong enough to pull the rod G, through the jaw $j^5$. In place of this construction the jaw $j^5$ may be automatically opened and closed by suitable known means.

If desired the burners F may be turned to one side while the glass rod is being moved toward and from the die, or as an equivalent the jets may be automatically lowered during said periods. To permit the burners to be turned to one side they are secured to a bracket F' pivoted to turn about a vertical spindle $k$, said bracket being connected with the lever L' by a link $l$ and turned by the movements of said lever.

The die head E, when provided with four dies as here shown, is turned through a quadrant for each stroke of the punch to present a new die to the latter. To effect this it is secured to a longitudinally movable shaft N to turn therewith by a bolt $m$ and is provided with projections $n$ arranged on its inner face and adapted to enter corresponding recesses $n'$ formed in the standard A'. A spring $o$ acting upon the shaft draws the die head against the standard. A shaft N' is arranged in line with the shaft N and carries a gear $p$, which meshes into a gear $p'$ on the driving shaft I. The gear $p$ is arranged to slide longitudinally on the shaft N' and is provided with a cam surface $q$ in engagement with a stationary cam surface $q'$. On the gear $p$ is one part of a friction clutch O, the opposite part being secured to shaft N. At the proper intervals the gear $p$ with its part of the friction clutch is forced forward by the action of the cam surfaces $q$ $q'$ to cause said part to engage the opposite part of the friction clutch and to press the shaft forward whereby the die head is released from the recesses $n'$ and turned through one quadrant its projections then snapping into the next succeeding recesses by the action of spring $o$, while simultaneously therewith gear $p$ is moved back and the clutch O opened.

The punch B is provided with the sleeve S having a pin and slot connection $d'$ $d^2$ therewith so as to permit longitudinal movement independent of the punch to be imparted thereto. Its interior diameter is such that when brought down over the hub $s$ of the die, it fits closely all around, so that when the punch is subsequently brought down upon the die to press the article, a clean edge is produced which will not require subsequent finishing. In the sleeve is formed a recess $s'$ which is made large enough to permit the passage of the glass rod,—the upper edge $s^2$ of said recess being sharpened or beveled to act as a cutter to sever the rod.

The mechanism for lowering the severing sleeve in advance of the punch to cut the glass and surround the hub, I have shown in Fig. 1 as consisting of a cam T pivoted at $b'$ to the frame and having a forked end engaging a grooved hub on the top of the sleeve. It will be noticed that the punch does not cut the material but serves only to press the same into shape. I have found that it is also advantageous, after the article has been pressed to raise the sleeve S before the upward stroke of the punch takes place to prevent the pressed article from being disfigured, for which purpose, as well as to cause the sleeve to descend in advance of the punch, the means illustrated in Figs. 12 and 14 may be used. In these figures U' represents a presser bar having its lower end forked and in engagement with the sleeve, while its upper end carries a roller stud entering a groove $u^3$ in a cam disk U, said groove being constructed as shown in Fig. 14 to cause the sleeve to descend with the punch on the downward stroke, but to force the said sleeve more rapidly downward in order to sever the rod and reach its lowest position before the punch reaches the mass. The sleeve is drawn upward from its lowest position after the mass has been pressed before the punch has started on the upward stroke, by part $u^5$ of the cam U. In this mechanism the spring $s^3$ may be omitted if the presser bar is connected with the sleeve instead of only bearing on it.

In the machine constructed as here shown for feeding a bar alternately from opposite sides to the die, it is necessary that the punch B or at least the sleeve S, should be turned after each stroke of the former to present the cutter $s^2$ to the rod. This may be accomplished by any usual means, for instance by an eccentric or cam $u$ on the main shaft I, which imparts motion to a pawl $u'$ engaging a ratchet wheel $v$ connected by bevel gears with a vertical shaft $w$ that in turn is geared to the punch B by wheels $w'$ $w^2$. In this machine as shown the shafts I' are rotated at one half the speed of the driving shaft I, while in the single machine it should be run at the same speed.

It is evident that various modifications of the several devices can be substituted, for instance, in place of using feed levers L L', feed wheels as L² and L³ (Fig. 5) can be employed. These wheels which may be segmental in form are geared to run in opposite directions and are provided with projecting portions or feed surfaces $j'$ $j^2$ adapted to engage with the glass rod which latter is supported upon suitable rolls $j^3 j^4$. The feed surface $j'$ which feeds the rod forward is longer than surface $j^2$. It will be noticed that the relative positions of the surfaces are such that after the rod has been fed to the die, it remains stationary until its end portion has been severed, whereupon it is returned to the burners by surface $j^2$, in which latter position it again remains stationary to give time for heating. The length of the feed surfaces may be made adjustable to provide for different feeds, or they may be removed and replaced by others. The feed surfaces of the wheels and the rolls $j^3 j^4$ may be covered either with rubber or other material suitable for the purpose.

In place of the friction clutch O for turning the die head E, the devices illustrated in Figs. 12 and 13 may be employed, the same consisting of a cam R, secured to the driving shaft I, a lever O' having on its upper end a roller stud engaging a groove in said cam while its lower end engages the spring pressed shaft N* to which the die head is secured, and the friction disks $p^2$ and $p^3$, the former provided with a segment $p^4$. The groove in cam R has at one spot an elevated portion $u^4$, which once in each revolution engages the roller stud of lever O' and causes the said lever to force the die head out of the recesses $n'$. At the same time the segment $p^4$ engages disk $p^3$ and turns the shaft N* through a quadrant.

If desired the glass rod may be heated by any usual means before it reaches the burners F to expedite the heating of the burners F and to prevent cracking.

In place of a rotary die head, a reciprocating or sliding die head or plate could be used, and it is also evident that the die head could be arranged to turn in a horizontal plane and the rod fed either vertically or horizontally. In place of the burners a furnace of suitable construction could be substituted.

The operation of the machine may be described in general as follows: In Fig. 1 the glass rod (left hand side of drawing) is in its position over the burners, while the punch is in its upward stroke. The rod remains in this position until heated to the proper degree when it is fed forward between the punch and die. The sleeve S descending in advance of the punch severs the glass and assumes the position shown by dotted lines in Fig. 9, and in full lines in Fig. 10, where it is held until the punch has descended and pressed out the article. The sleeve now ascends while the punch is still held in the aforesaid position. After the sleeve has risen a short distance the punch follows it. Immediately after the sleeve has severed the required length, the rod is returned to the burners, while under the action of the burners the rod is turned by the grip lever H. After the sleeve and punch have cleared the die the die head E is turned through a quadrant to present a new die to the punch.

In the duplex machine the punch is turned while on its upward stroke, the rods being fed alternately to the punch and die.

To permit the die D to yield in case the quantity of glass should exceed the proper amount the hub $s$ is provided with a shoulder $s^5$ fitted in a recess in the slide $s^4$, said die being supported upon a plug $s^6$ resting on a spring $s^7$ placed in a recess $s^8$ in the die head E. A blast of air may be directed upon the spring to aid in keeping the same cool.

What I claim as new, and desire to secure by Letters Patent, is—

1. In an organized machine for the continuous manufacture of articles of glass, the combination of a punch and die, a mechanism for feeding a glass rod intermittently between the punch and die, and a burner located between the feed mechanism and the punch and die for heating the end of the rod all combined and operating substantially as set forth.

2. In an organized machine for the continuous manufacture of articles of glass, the combination of a punch and die, a mechanism for feeding a glass rod intermittently between the punch and die, a burner located between the feed mechanism and the punch and die for heating the end of the rod, and a severing device located at the punch and die, substantially as and for the purpose set forth.

3. In a machine for manufacturing articles of glass, a punch and die, a mechanism for feeding the glass rod toward the punch and die, a burner located between the feed mechanism and the punch and die, mechanism for rotating the rod within the feed mechanism and a severing device, substantially as described.

4. In a machine for manufacturing articles of glass, a punch and die, a burner for heating the rod located in proximity to the punch and die, and a mechanism for automatically feeding the rod to bring its end between the punch and die and returning the rod to bring its end into the flame, substantially as described.

5. In a machine for manufacturing articles of glass, a die head, means for rotating the same, a reciprocating punch arranged in line with the die head, a mechanism for automatically feeding the glass rod between the die head and punch and a burner located between the die head and punch and the feed mechanism for heating the end of the rod, substantially as described.

6. The combination with a punch and die arranged in line and of substantially the same diameter, a sleeve fitted to the punch and adapted to slide upon the same, and means for moving the punch over the adjoining end of the die to inclose the same, substantially as and for the purpose set forth.

7. In a machine of the character specified, a severing sleeve thrown into action in advance of the punch on the operating stroke and being withdrawn from the die in advance of the punch on the return stroke, substantially as described.

8. In a machine of the character specified, a severing sleeve provided with a recess terminating in a cutting edge, and adapted to fit over the die, said sleeve being thrown into action to encompass the die in advance of the punch on the operating stroke, and being withdrawn from the die in advance of the punch on the return stroke, substantially as and for the purpose set forth.

9. In combination with a punch and die, a sleeve adapted to slide on the punch and fit over the die, said sleeve being provided with a lateral recess terminating in a cutting edge, substantially as described.

10. The die head E having two or more dies and provided with projections $n$ adapted to engage recesses $n'$ in a stationary part of the machine, a cam or equivalent means for forcing the die head outwardly to clear its projections from the recesses, and friction surfaces thrown into contact on the release of the die head for turning the same through a predetermined angle, substantially as described.

11. In a machine of the character specified, a differential device for feeding the rod forward to the punch and die and returning the same to the heating device, substantially as described.

12. In a machine of the character specified, the feed segments rotating in opposite directions and adapted to engage the rod for feeding the same alternately in opposite directions, substantially as described.

13. In a machine of the character specified, the adjustable feed segments geared together to rotate in opposite directions and adapted to engage the rod for feeding the same alternately in opposite directions, substantially as described.

14. The combination with the die and the reciprocating punch and the sleeve mounted thereon, of the cam U and the arm U′ engaging said sleeve and imparting thereto a motion to advance the same more rapidly than the punch on the operating stroke, substantially as and for the purpose set forth.

15. The spring pressed die head E having two or more dies and secured as described, combined with means for clearing the said die head and frictional means for turning the same, substantially as described.

16. In a machine of the character specified, a mechanism for feeding a glass rod toward and from the die and punch, a burner for heating the end of the rod and means for automatically reducing the heat on the rod while same is being moved toward and from the punch and dies, substantially as described.

17. In a machine of the character specified, the burners F mounted on brackets F′, a mechanism for feeding the glass rod, and means for automatically turning the burners to one side, when the rod is moved toward or from the punch and die, substantially as described.

18. In a machine of the character specified, a punch and die or their equivalent, two mechanisms arranged on opposite sides of the punch and die for alternately feeding glass rods to the punch and die, and heating devices, such as the burners F for heating the ends of the glass rods, substantially as described.

19. In a machine of the character specified, the feed levers L L′ provided with suitable grips engaging the rod, combined with the cam $g$ and link $f$, all substantially as and for the purpose set forth.

20. The die head E provided with recess $s^8$ combined with die D and spring $s^7$, substantially as and for the purpose set forth.

In testimony that I claim the foregoing as my invention I have signed my name, in presence of two witnesses, this 15th day of October, 1891.

WILLIAM BECHTOLD.

Witnesses:
A. FABER DU FAUR, Jr.,
F. FOHR.